United States Patent
Knoll et al.

(10) Patent No.: US 8,536,279 B2
(45) Date of Patent: Sep. 17, 2013

(54) PHASE-SEPARATING BLOCK OR GRAFT COPOLYMERS COMPRISING INCOMPATIBLE HARD BLOCKS AND MOULDING COMPOSITIONS HAVING A HIGH STIFFNESS

(75) Inventors: Konrad Knoll, Mannheim (DE); Jürgen Koch, Neuhofen (DE); Piyada Charoensirisomboon, Mannheim (DE); Daniel Wagner, Bad Dürkheim (DE); Geert Verlinden, Stekene (BE); Roland Weidisch, Schoenebeck (DE)

(73) Assignee: Styrolution GmbH (DE)

( * ) Notice: Subject to any disclaimer, the term of this patent is extended or adjusted under 35 U.S.C. 154(b) by 29 days.

(21) Appl. No.: 13/141,870

(22) PCT Filed: Dec. 14, 2009

(86) PCT No.: PCT/EP2009/067019
§ 371 (c)(1),
(2), (4) Date: Jun. 23, 2011

(87) PCT Pub. No.: WO2010/072596
PCT Pub. Date: Jul. 1, 2010

(65) Prior Publication Data
US 2012/0061287 A1   Mar. 15, 2012

(30) Foreign Application Priority Data

Dec. 23, 2008 (EP) .................................... 08172791

(51) Int. Cl.
*C08L 53/02* (2006.01)
*C08F 279/00* (2006.01)

(52) U.S. Cl.
USPC ............ 525/314; 525/315; 525/316; 525/88; 525/98; 525/99; 525/240; 525/241

(58) Field of Classification Search
USPC .............. 525/314, 315, 316, 88, 98, 99, 232, 525/240, 241
See application file for complete search history.

(56) References Cited

U.S. PATENT DOCUMENTS

| | | | |
|---|---|---|---|
| 3,639,517 A | 2/1972 | Kitchen et al. | |
| 5,585,443 A * | 12/1996 | Ozawa et al. | 525/314 |
| 6,369,160 B1 * | 4/2002 | Knoll et al. | 525/89 |
| 6,521,712 B1 | 2/2003 | Knoll et al. | |
| 6,579,937 B1 | 6/2003 | Guntherberg et al. | |
| 6,916,879 B2 * | 7/2005 | Knoll et al. | 525/89 |
| 2003/0083434 A1 * | 5/2003 | Ouhadi et al. | 525/80 |
| 2005/0143506 A1 * | 6/2005 | Harrington et al. | 524/318 |
| 2006/0128890 A1 | 6/2006 | Knoll et al. | |
| 2008/0269414 A1 | 10/2008 | Knoll et al. | |
| 2010/0304067 A1 | 12/2010 | Knoll et al. | |
| 2011/0065819 A1 | 3/2011 | Schips et al. | |
| 2011/0257335 A1 * | 10/2011 | Knoll et al. | 525/89 |

FOREIGN PATENT DOCUMENTS

| | | | |
|---|---|---|---|
| CA | 1087339 A1 | | 10/1980 |
| CA | 2718001 | * | 9/2009 |
| DE | 2550227 A1 | | 5/1977 |
| DE | 19858141 A1 | | 6/2000 |
| DE | 19914075 A1 | | 9/2000 |
| EP | 0654488 A1 | | 5/1995 |
| EP | 1 498 438 A1 | | 1/2005 |
| EP | 1669407 A1 | | 6/2006 |
| WO | WO-00-58380 A1 | | 10/2000 |
| WO | WO-2006/074819 A1 | | 7/2006 |
| WO | WO-2009/037115 A1 | | 3/2009 |
| WO | WO-2009/112549 A1 | | 9/2009 |

* cited by examiner

*Primary Examiner* — Mark Kaucher
(74) *Attorney, Agent, or Firm* — Novak Druce Connolly Bove + Quigg LLP

(57) ABSTRACT

A block copolymer or graft copolymer with weight-average molar mass $M_w$ of at least 100 000 g/mol, comprising
  a) at least one block S composed of from 95 to 100% by weight of vinylaromatic monomers and from 0 to 5% by weight of dienes, and
  b) at least one copolymer block $(S/B)_A$ composed of from 63 to 80% by weight of vinylaromatic monomers and from 20 to 37% by weight of dienes, with glass transition temperature $Tg_A$ in the range from 5 to 30° C.,
where the proportion by weight of the entirety of all of the blocks S is in the range from 50 to 70% by weight, based on the block copolymer or graft copolymer, and also mixtures thereof, and their use.

10 Claims, No Drawings

PHASE-SEPARATING BLOCK OR GRAFT COPOLYMERS COMPRISING INCOMPATIBLE HARD BLOCKS AND MOULDING COMPOSITIONS HAVING A HIGH STIFFNESS

CROSS-REFERENCE TO RELATED APPLICATION

This application is a national stage application (under 35 U.S.C. §371) of PCT/EP2009/067019, filed Dec. 14, 2009, which claims benefit of European application 08172791.9 filed Dec. 23, 2008.

BACKGROUND OF INVENTION

The invention relates to a block copolymer or graft copolymer with weight-average molar mass $M_w$ of at least 100 000 g/mol, comprising
a) at least one block S composed of from 95 to 100% by weight of vinylaromatic monomers and from 0 to 5% by weight of dienes, and
b) at least one copolymer block $(S/B)_A$ composed of from 63 to 80% by weight of vinylaromatic monomers and from 20 to 37% by weight of dienes, with glass transition temperature $Tg_A$ in the range from 5 to 30° C.,
where the proportion by weight of the entirety of all of the blocks S is in the range from 50 to 70% by weight, based on the block copolymer or graft copolymer, and also mixtures thereof, and their use.

U.S. Pat. No. 3,639,517 describes star-shaped branched styrene-butadiene block copolymers having from 75 to 95 percent by weight of terminal blocks composed of vinylaromatic monomers, and from 5 to 30 percent by weight of elastomeric blocks mainly composed of conjugated diene units. They can be blended with standard polystyrene to give highly transparent mixtures. With increasing proportion of polystyrene, modulus of elasticity rises, with attendant losses in toughness. Mixtures using as little as 40 percent by weight of polystyrene are too brittle for most applications. If acceptable ductility is to be retained, the possible admixture of polystyrene is mostly only 20, up to a maximum of 30, percent by weight.

Star-shaped block copolymers having 40% by weight of hard blocks composed of vinylaromatic monomers, and soft blocks having random structure composed of vinylaromatic monomers and dienes, are described in WO 00/58380. They are blended with standard polystyrene in order to increase stiffness, whereupon transparency falls. Even with 60 percent by weight of polystyrene, they continue to give ductile mixtures. The disadvantage of these blends is the clearly visible haze, which is unacceptable for more demanding applications and thicker components.

WO 2006/074819 describes mixtures of from 5 to 50% by weight of a block copolymer A, which comprises one or more copolymer blocks $(B/S)_A$ in each case composed of from 65 to 95% by weight of vinylaromatic monomers and from 35 to 5% by weight of dienes, with glass transition temperature TgA in the range from 40° to 90° C., and from 95 to 50% by weight of a block copolymer B which comprises at least one hard block S composed of vinylaromatic monomers, and one or more copolymer blocks $(B/S)_B$ in each case composed of from 20 to 60% by weight of vinylaromatic monomers and from 80 to 40% by weight of dienes, with glass transition temperature $Tg_B$ in the range from −70° to 0° C., for the production of shrink foils. The stiffness of the mixtures is in the range from 700 to a maximum of 1300 MPa.

EP-A 1 669 407 discloses mixtures composed of linear block copolymers composed of vinylaromatic monomers and dienes of the structure (I) S1-B1-S2 and (II) B2-S3. The blocks B1 and B2 can be composed exclusively of dienes, or of dienes and vinylaromatic monomers. The ratio by weight of vinylaromatic monomer to diene for the blocks B1 and B2 is preferably in the range from 0.3 to 1.5.

PCT/EP2008/061635, as yet unpublished, describes transparent, tough and stiff molding compositions based on styrene-butadiene block copolymer mixtures which can comprise, inter alia, from 0 to 30% by weight of a block copolymer which comprises at least one copolymer block $(B/S)_A$ in each case composed of from 65 to 95% by weight of vinylaromatic monomers and from 35 to 5% by weight of dienes, with glass transition temperature $Tg_A$ in the range from 40 to 90° C., and at least one copolymer block $(B/S)_B$ in each case composed of from 1 to 60% by weight of vinylaromatic monomers and from 99 to 40% by weight of dienes, with glass transition temperature $Tg_B$ in the range from −100 to 0° C.

Any desired modulus of elasticity extending to above 3000 MPa can be obtained via blending of conventional styrene-butadiene block copolymers, such as Styrolux®, with polystyrene, as a function of mixing ratio. However, experience has shown that no useful ductility is retained when the modulus of elasticity is above 1900 MPa. The mechanical behavior of the mixtures is then similar to that of polystyrene itself, and they then have no advantages over the latter.

Blister packs, thermoformed containers and pots, and packaging materials for electronic components, for example extruded hollow profiles used as transport tubes for integrated circuits, require a combination of high stiffness and ductility and good transparency, while dependably exceeding the required yield stress value. These are applications for which polystyrene and its mixtures with styrene-butadiene block copolymers have hitherto had no, or only limited, suitability. The market has hitherto been covered by polyvinyl chloride (PVC), and to some extent by polyethylene terephthalates (PET), or very expensive specialty polymers.

BRIEF DESCRIPTION OF THE INVENTION

It was an object of the invention to find block copolymers which can be processed with polystyrenes to give transparent molding compositions which are tough and stiff. The mixtures should be processible to give molding compositions with high stiffness, and in particular have a modulus of elasticity of from more than 1900 to 2500 MPa, combined with a particular ductility in the tensile test.

Accordingly, the abovementioned block copolymers and graft copolymers have been found, as also have mixtures with further styrene polymers.

Surprisingly, it has now been found that the block copolymers and graft copolymers of the invention, which comprise one or more blocks S/B with glass transition temperature in the range from 5 to 30° C., form the soft phase in molding compositions composed of polystyrene or of polymers comprising polystyrene blocks, and, in comparison with conventional molding compositions composed of block copolymers having butadiene-rich blocks, have markedly increased yield stress, and higher modulus of elasticity, together with good ductility.

Block Copolymer or Graft Copolymer:
The block copolymer or graft copolymer of the invention comprises a) at least one block S composed of from 95 to 100% by weight of vinylaromatic monomers and from 0 to 5% by weight of dienes, and b) at least one copolymer block $(S/B)_A$ composed of from 63 to 80% by weight of vinylaromatic monomers and from 20 to 37% by weight of dienes, with glass transition temperature $Tg_A$ in the range from 5 to 30° C.,

DETAILED DESCRIPTION OF INVENTION

Examples of vinylaromatic monomers that can be used are styrene, alpha-methylstyrene, ring-alkylated styrenes, such as p-methylstyrene, or tert-butylstyrene, or 1,1-diphenylethylene, or a mixture thereof. It is preferable to use styrene.

Preferred dienes are butadiene, isoprene, 2,3-dimethylbutadiene, 1,3-pentadiene, 1,3-hexadiene, or piperylene, or a mixture of these. Particular preference is given to butadiene and isoprene.

The weight-average molar mass $M_w$ of the block copolymer or graft copolymer is preferably in the range from 250 000 to 350 000 g/mol.

The blocks S are preferably composed of styrene units. In the case of the polymers produced via anionic polymerization, the molar mass is controlled by way of the ratio of amount of monomer to amount of initiator. However, initiator can also be added a number of times after completion of monomer feed, the product then being bi- or multimodal distribution. In the case of polymers produced by a free-radical route, the weight-average molecular weight $M_w$ is set by way of the polymerization temperature and/or addition of regulators.

The glass transition temperature of the copolymer block $(S/B)_A$ is preferably in the range from 5 to 20° C. The glass transition temperature is affected by the comonomer constitution and comonomer distribution, and can be determined via Differential Scanning calorimetry (DSC) or Differential Thermal Analysis (DTA), or can be calculated from the Fox equation. The glass transition temperature is generally determined using DSC to ISO 11357-2 with a heating rate of 20 K/min.

The copolymer block $(S/B)_A$ is preferably composed of from 65 to 75% by weight of styrene and from 25 to 35% by weight of butadiene.

Preference is given to block copolymers or graft copolymers which comprise one or more copolymer blocks $(S/B)_A$ composed of vinylaromatic monomers and dienes with random distribution. These can by way of example be obtained via anionic polymerization using alkyllithium compounds in the presence of randomizers, such as tetrahydrofuran, or potassium salts. Preference is given to use of potassium salts, using a ratio of anionic initiator to potassium salt in the range from 25:1 to 60:1. Particular preference is given to cyclohexane-soluble alcoholates, such as potassium tert-butylamyl alcoholate, these being used in a lithium-potassium ratio which is preferably from 30:1 to 40:1. This method can simultaneously achieve a low proportion of 1,2-linkages of the butadiene units.

The proportion of 1,2-linkages of the butadiene units is preferably in the range from 8 to 15%, based on the entirety of 1,2-, 1,4-cis-, and 1,4-trans linkages.

The weight-average molar mass $M_w$ of the copolymer block $(S/B)_A$ is generally in the range from 30 000 to 200 000 g/mol, preferably in the range from 50 000 to 100 000 g/mol.

Random copolymers $(S/B)_A$ can, however, also be produced via free-radical polymerization.

At room temperature, the blocks $(S/B)_A$ form a semi-hard phase in the molding composition, and this phase is responsible for the high ductility and tensile strain at break values, i.e. high elongation at low strain rate.

The graft polymers can be divided into two types: type 1) is composed of a main chain composed of a random S/B polymer and polystyrene graft branches, while type 2) has a polystyrene main chain having S/B side groups. Type 1) is preferred.

There are a number of synthesis strategies for the production of graft polymers of this type:

a) Graft branch in the form of macromonomer, which is by way of example copolymerized by a free-radical route with further monomers.

Synthesis method: Use of an initiator or regulator having an OH or $NH_2$ group. Example of initiator: hydrogen peroxide; example of regulator: thioethanolamine or HS—$CH_2$—$(CH2)_n$—OH. The molecular weight can be adjusted by way of the amount of regulator and the temperature. It is thus possible to obtain end-group-functionalized polystyrene and, respectively, S/B. A copolymerizable acrylic or methacrylic group is introduced by reaction with acryloyl chloride or methacryloyl chloride, with formation of an ester group or amide group. The macromonomer is then dissolved in styrene or in a mixture composed of styrene and butadiene, and polymerized either thermally or using a free-radical initiator and optionally a regulator.

b) Graft branch having functional end group and main chain having reactive group or groups.

Synthesis method: The main chain can be copolymerized with small amounts of reactive monomer, e.g. maleic anhydride. The graft branch is regulated as with a), for example using a thioethanolamine, and then reacted with the main chain with formation of an amide, which gives a highly stable imide on heating.

c) Direct free-radical grafting onto main chain via generation of a free radical on the main chain Synthesis Method:

1) S/B main chain: Grafting of polystyrene onto S/B main chain either thermally or using free-radical initiator, preferably under controlled free-radical conditions, for example with addition of TEMPO 2) Introduction of functional groups at the main chain via copolymerization using functional monomers (hydroxyethyl methacrylate, etc.), followed by introduction of free-radical initiator at the main chain.

d) Grafting of carbanion onto main chain

Synthesis method: Production of a main chain having a few monomer units which are reactive toward carbanions, examples being carbonyl compounds, such as esters, anhydrides, nitriles, epoxides, etc. Examples of monomers for this purpose are acrylates, methacrylates, acrylonitrile, etc. The main monomer can be styrene, for example. Monomers having leaving groups can moreover be used, an example being chloromethyl groups. However, it is also possible that the entire main chain is an acrylate copolymer, for example MMA/n-butyl acrylate, the monomer ratio here being selected in such a way that the Tg of the polymer is about 20° C., i.e. about 40/60 by weight.

The branch is separately produced via living anionic polymerization, and added to the main chain produced by a free-radical route. Preference is given to styrene and its derivatives. The product is then an MMA/nBA-g-styrene graft copolymer.

The block copolymers or graft copolymers can also comprise c) at least one homopolydiene (B) block or copolymer block $(S/B)_B$ composed of from 1 to 60% by weight, preferably from 20 to 60% by weight, of vinylaromatic monomers and from 40 to 99% by weight, preferably from 40 to 80% by weight, of dienes, with glass transition temperature $Tg_B$ in the range from 0 to –110° C.

The glass transition temperature of the copolymer block $(S/B)_B$ is preferably in the range from –60 to –20° C. The glass transition temperature is affected by the comonomer constitution and comonomer distribution, and can be determined via differential scanning calorimetry (DSC) or differential thermal analysis (DTA), or can be calculated from the Fox equation. The glass transition temperature is generally determined using DSC to ISO 11357-2 with a heating rate of 20 K/min.

The copolymer block $(S/B)_B$ is preferably composed of from 30 to 50% by weight or styrene and from 50 to 70% by weight of butadiene.

Preference is given to block copolymers or graft copolymers which comprise one or more copolymer blocks $(S/B)_B$ composed of vinylaromatic monomers and dienes with random distribution. These can by way of example be obtained via anionic polymerization using alkyllithium compounds in the presence of randomizers, such as tetrahydrofuran, or potassium salts. Preference is given to use of potassium salts, using a ratio of anionic initiator to potassium salt in the range from 25:1 to 60:1. This method can simultaneously achieve a low proportion of 1,2-linkages of the butadiene units.

The proportion of 1,2-linkages of the butadiene units is preferably in the range from 8 to 15%, based on the entirety of 1,2-, 1,4-cis-, and 1,4-trans linkages.

Random copolymers $(S/B)_B$ can, however, also be produced via free-radical polymerization.

The blocks B and/or $(S/B)_B$ forming a soft phase can be uniform over their entire length or can have division into differently constituted sections. Preference is given to sections having diene (B) and $(S/B)_B$ which can be combined in various sequences. Gradients are possible, having continuously changing monomer ratio, and the gradient here can begin with pure diene or with a high proportion of diene, with styrene proportion rising as far as 60%. A sequence of two or more gradient sections is also possible. Gradients can be generated by reducing or increasing the amount added of the randomizer. It is preferable to set a lithium-potassium ratio greater than 40:1 or, if tetrahydrofuran (THF) is used as randomizer, to use an amount of THF less than 0.25% by volume, based on the polymerization solvent. An alternative is simultaneous feed of diene and vinylaromatic compound at a slow rate, based on the polymerization rate, the monomer ratio being controlled here in accordance with the desired constitution profile along the soft block.

The weight-average molar mass $M_w$ of the copolymer block $(S/B)_B$ is generally in the range from 50 000 to 100 000 g/mol, preferably in the range from 10 000 to 70 000 g/mol.

The proportion by weight of the entirety of all of the blocks S is in the range from 50 to 70% by weight, and the proportion by weight of the entirety of all of the blocks $(S/B)_A$ and $(S/B)_B$ is in the range from 30 to 50% by weight, based in each case on the block copolymer or graft copolymer.

There is preferably a block S separating blocks $(S/B)_A$ and $(S/B)_B$ from one another.

The ratio by weight of the copolymer blocks $(S/B)_A$ to the copolymer blocks $(S/B)_B$ is preferably in the range from 80:20 to 50:50.

Preference is given to block copolymers having linear structures, in particular those having the block sequence $S_1$-$(S/B)_A$-$S_2$ (triblock copolymers)
$S_1$-$(S/B)_A$-$S_2$-$(S/B)_B$-$S_3$, or
$S_1$-$(S/B)_A$-$S_2$-$(S/B)_A$-$S_3$ (pentablock copolymers), where each of $S_1$ and S2 is a block S.

These feature a high modulus of elasticity of from 1500 to 2000 MPa, high yield stress in the range from 35 to 42 MPa, and tensile strain at break above 30%, in mixtures using a proportion of more than 80% by weight of polystyrene. By way of comparison, commercial SBS block copolymers having this proportion of polystyrene have a tensile strain at break value of only from 3 to 30%.

Preference is given to triblock copolymers of the structure $S_1$-$(S/B)_A$-$S_2$, which comprise a block $(S/B)_A$ composed of from 70 to 75% by weight of styrene units and from 25 to 30% by weight of butadiene units. Glass transition temperatures can be determined using DSC, or calculated from the Gordon-Taylor equation, and for this constitution are in the range from 1 to 10° C. The proportion by weight of the blocks $S_1$ and $S_2$, based on the triblock copolymer, is in each case preferably from 30% to 35% by weight. The total molar mass is preferably in the range from 150 000 to 350 000 g/mol, particularly preferably in the range from 200 000 to 300 000 g/mol.

Particular preference is given to pentablock copolymers of the structure $S_1$-$(S/B)_A$-$S_2$-$(S/B)_A$-$S_3$, which comprise a block $(S/B)_A$ composed of from 70 to 75% by weight of styrene units and from 25 to 30% by weight of butadiene units. Glass transition temperatures can be determined using DSC, or calculated from the Gordon-Taylor equation, and for this constitution are in the range from 1 to 10° C. The proportion by weight of the entirety of the blocks $S_1$ and $S_2$, based on the pentablock copolymer, is preferably from 50% to 67% by weight. The total molar mass is preferably in the range from 260 000 to 350 000 g/mol. Tensile strain at break values of up to 300% with a proportion of more than 85% of styrene can be achieved here by virtue of the molecular architecture.

The block copolymers A can moreover have a star-shaped structure which comprises the block sequence $S_1$-$(S/B)_A$-$S_2$-X-$S_2$-$(S/B)_A$-$S_1$, where each of $S_1$ and $S_2$ is a block S, and X is the radical of a polyfunctional coupling agent. An example of a suitable coupling agent is epoxidized vegetable oil, such as epoxidized linseed oil or epoxidized soybean oil. The product in this case is stars having from 3 to 5 branches. The average constitution of the star-shaped block copolymers is preferably two $S_1$-$(S/B)_A$-$S_2$- arms and two $S_3$ blocks linked by way of the radical of the coupling agent, and the block copolymers mainly comprise the structure $S_1$-$(S/B)_A$-$S_2$-X$(S_3)_2$-$S_2$-$(S/B)_A$-$S_1$, where $S_3$ is a further S block. The molecular weight of the block $S_3$ should be smaller than that of the blocks $S_1$. The molecular weight of the block $S_3$ preferably corresponds to that of the block $S_2$.

These star-shaped block copolymers can by way of example be obtained via double initiation, adding an amount $I_1$ of initiator together with the vinylaromatic monomers needed for formation of the blocks $S_1$, and an amount $I_2$ of initiator together with the vinylaromatic monomers needed for formation of the $S_2$ blocks and $S_3$ blocks, after completion of the polymerization of the $(S/B)_A$ block. The molar $I_1/I_2$ ratio is preferably from 0.5:1 to 2:1, particularly preferably from 1.2:1 to 1.8:1. The molar mass distribution of the star-shaped block copolymers is generally broader than that of the linear block copolymers. This leads to improved transparency, at constant flowability.

Block copolymers or graft copolymers which are composed of the blocks S, $(S/B)_A$, and $(S/B)_B$, for example pentablock copolymers of the structure $S_1$-$(S/B)_A$-$S_2$-$(S/B)_A$-$S_3$, form co-continuous morphology. Here, there are three different phases combined in one polymer molecule. The soft phase formed from the $(S/B)_B$ blocks provides the impact resistance in the molding composition, and can prevent propagation of cracks (crazes). The semi-hard phase formed from the blocks (S/B)$_A$ is responsible for the high ductility and tensile strain at break values. Modulus of elasticity and yield stress can be adjusted by way of the proportion of the hard phase formed from the blocks S and optionally admixed polystyrene.

The block copolymers or graft copolymers of the invention generally form highly transparent, nanodisperse, multiphase mixtures with standard polystyrene.

The block copolymer or graft copolymer of the invention is a suitable component K1) in transparent molding compositions which are tough and stiff, using polystyrene as component K2) and optionally using a block copolymer K3) which differs from K1).

A preferred mixture is composed of the following components:

K1) from 20 to 95% by weight of a block copolymer A or graft copolymer A according to any of claims 1 to 8, and K2) from 5 to 80% by weight of standard polystyrene (GPPS) or impact-resistant polystyrene (HIPS), and K3) from 0 to 50% by weight, preferably from 10 to 30% by weight, of a block copolymer B which differs from K1 and is composed of vinylaromatic monomers and dienes.

In molding compositions using this mixture, the block with glass transition temperature below −30° C. of components K3) forms the soft phase, and the hard phase is formed from at least two different domains, which are composed of polystyrene or, respectively, a polystyrene block and the block (S/B)$_A$ of the block copolymer or graft copolymer of component K1).

Component K1)

The block copolymer or graft copolymer described above of the invention is used as component K1).

Component K2)

A styrene polymer, preferably standard polystyrene (GPPS), or impact-resistant polystyrene (HIPS), is used as component K2). For maintaining transparency, particular preference is given to standard polystyrene in the form of oil-free or oil-containing variants. Examples of suitable standard polystyrenes are Polystyrene 158 K and Polystyrene 168 N from BASF SE, or the corresponding oil-containing variants Polystyrene 143 E or Polystyrene 165 H. It is preferable to use from 10 to 70% by weight of relatively high-molecular-weight polystyrenes with weight-average molar mass M$_w$ in the range from 220 000 to 500 000 g/mol, and it is particularly preferable to use from 20 to 40% by weight of these.

Component K3)

The component K3) used can be a block copolymer composed of vinylaromatic monomers and dienes, and differing from K1). It is preferable to use, as component K3), a styrene-butadiene block copolymer which has a block B with glass transition temperature below −30° C., acting as soft block.

The mixture preferably comprises, as component K3), a block copolymer which comprises a) at least one block S composed of from 95 to 100% by weight of vinylaromatic monomers and from 0 to 5% by weight of dienes, and b) at least one copolymer block (S/B)$_B$ composed of from 20 to 60% by weight of vinylaromatic monomers and from 40 to 80% by weight of dienes, with glass transition temperature Tg$_B$ in the range from 0 to −80° C., preferably in the range from −65° C. to −20° C., where the proportion by weight of the entirety of all of the blocks S is in the range from 25 to 70% by weight, and the proportion by weight of the entirety of all of the blocks (S/B)$_B$ is in the range from 30 to 75% by weight, based in each case on the block copolymer B.

A similarly preferred component K3) is a block copolymer which comprises a) at least one block S composed of from 95 to 100% by weight of vinylaromatic monomers and from 0 to 5% by weight of dienes, and b) at least one homopolydiene (B) or copolymer block (S/B)$_B$ composed of from 0 to 60% by weight of vinylaromatic monomers and from 40 to 100% by weight of dienes, with glass transition temperature Tg$_B$ in the range from 0 to −110° C., preferably in the range from −70 to −110° C., where the proportion by weight of the entirety of all of the blocks S is in the range from 25 to 90% by weight, preferably in the range from 65 to 85% by weight, and the proportion by weight of the entirety of all of the blocks (S/B)$_B$ is in the range from 10 to 75% by weight, preferably in the range from 15 to 35% by weight, based in each case on the block copolymer.

The mixture of the invention preferably comprises from 5 to 45% by weight, particularly preferably from 20 to 40% by weight, of the block copolymer K3.

Suitable block copolymers K3) are in particular stiff block copolymers which are composed of from 60 to 90% by weight of vinylaromatic monomers and from 10 to 40% by weight of diene, based on the entire block polymer, and whose structure is mainly composed of hard blocks S comprising vinylaromatic monomers, in particular styrene, and of soft blocks B or S/B comprising dienes, such as butadiene and isoprene. Particular preference is given to block copolymers having from 65 to 85% by weight, particularly preferably from 70 to 80% by weight, of styrene and from 15 to 35% by weight, particularly preferably from 20 to 30% by weight, of diene.

The copolymer blocks (S/B)$_B$ of the block copolymer K3) preferably have random distribution of the vinylaromatic monomers and dienes.

Blocks having tapered transitions or having a gradient from a relatively high to a relatively low diene/vinylaromatic ratio are likewise possible.

Preferred block copolymers K3) have a star-shaped structure having at least two terminal hard blocks S$_1$ and S$_2$ with different molecular weight composed of vinylaromatic monomers, where the proportion of the entirety of the hard blocks S is at least 40% by weight, based on the entire block copolymer B. Linear structures are also possible, examples being (S/B)$_B$-S$_2$, or S$_1$-(S/B)$_B$-S$_2$, or S$_1$-(B->S)$_n$.

The number-average molar mass M$_n$ of the terminal blocks S$_1$ is preferably in the range from 5 000 to 30 000 g/mol, and the number-average molar mass M$_n$ of these blocks S$_2$ is preferably in the range from 35 000 to 150 000 g/mol.

Preference is given to polymodal styrene-butadiene block copolymers having terminal styrene blocks, for example those described in DE-A 25 50 227 or EP-A 0 654 488.

Particular preference is given to block copolymers K3) having at least two blocks S$_1$ and S$_2$ composed of vinylaromatic monomers and having, between these, at least one random block (S/B)$_B$ composed of vinylaromatic monomers and dienes, where the proportion of the hard blocks is above 40% by weight, based on the entire block copolymer, and the 1,2-vinyl content in the soft block S/B is below 20%, for example those described in WO 00/58380.

The block copolymers K3) are commercially available, for example with the trademarks Styrolux® 3G 33/Styroclear® GH 62, Styrolux® 693 D, Styrolux® 684, Styrolux® 656 C, Styrolux® 3G55, K-Resin® 03, K-Resin® 04, K-Resin® 05, K-Resin® 10, K-Resin® KK38, K-Resin® 01, K-Resin® XK 40, Kraton® D 1401P, Finaclear 520, 530, 540, 550; Asaflex® 805, 810, 825, 835, 840, 845 Asaflex® product line, Clearen® 530 L, and 730 L.

Plasticizer

It is possible to use, as plasticizer E, from 0 to 6% by weight, preferably from 2 to 4% by weight, of a homogeneously miscible oil or oil mixture, in particular white oil, vegetable oils, or aliphatic esters, such as dioctyl adipate, or a mixture of these. Medicinal white oil is preferably used.

The mixtures of the invention are highly transparent and are particularly suitable for the production of foils, in particular of thermoforming foils for blister packs, and of containers or moldings for the packaging of electronic components, and in particular for extruded hollow profiles for integrated circuits (ICs). They are moreover suitable for the production of injection moldings which are tough and stiff.

EXAMPLES

Test Methods:

Glass transition temperatures were determined using Differential Scanning calorimetry (DSC) to ISO 11357-2 with a heating rate of 20 K/min.

Molecular weights were determined using gel permeation chromatography (GPC) in tetrahydrofuran (THF) at 23° C., by means of UV detection, and evaluated by using polystyrene as standard.

Modulus of elasticity, yield stress, and tensile strain at break were determined to ISO 527.

Block copolymers K1-1 to K1-7

For production of the linear styrene-butadiene block copolymers A, 5385 ml of cyclohexane were used as initial charge in a 10 liter double-walled stirred stainless-steel autoclave with cross-blade stirrer, and titrated to the end point with 1.6 ml of sec-butyllithium (BuLi) at 60° C., until a yellow coloration appeared, brought about by 1,1-diphenylethylene used as indicator, and 3.33 ml of a 1.4 M sec-butyllithium solution were then admixed for initiation, and 0.55 ml of a 0.282 M potassium tert-amyl alcoholate (PTAA) solution was admixed as randomizer. The amount of styrene (280 g of styrene 1) necessary for the production of the first S block was then added and polymerized to completion. The further blocks were attached in accordance with the structure and constitution stated in table 1 via sequential addition of the appropriate amounts of styrene or styrene and butadiene, in each case with complete conversion. For production of the copolymer blocks, styrene and butadiene were added simultaneously in a plurality of portions, and the maximum temperature was limited to 77° C. by countercurrent cooling. For block copolymer K1-3, 84 g of butadiene 1 and 196 g of styrene 2 were used here for the block $(S/B)_4$, 280 g of styrene 3 were used for the block $S_2$, 84 g of butadiene B2 and 196 g of styrene 4 were used for the block $(S/B)_4$ and 280 g of styrene 5 were used for the block $S_1$.

The living polymer chains were then terminated via addition of 0.83 ml of isopropanol, and 1.0% of $CO_2$/0.5% of water, based on solids, were used for acidification, and a stabilizer solution (0.2% of Sumilizer GS and 0.2% of Irganox 1010, based in each case on solids) was added. The cyclohexane was removed by evaporation in a vacuum oven.

Weight-average molar mass $M_w$ for the block copolymers K1-1 to K1-7 is in each case 300 000 g/mol.

By analogy with block copolymers K1-3, further block copolymers having the structure $S_1$-$(S/B)_4$-$S_2$-$(S/B)_4$-$S_1$ were produced, the molecular weight here being varied via different amounts of initiator.

Block Copolymer K1-3a:

Structure: $S_1$-$(S/B)_4$-$S_2$-$(S/B)_4$-$S_1$, (20-20-20-20-20% by weight), weight-average molar mass 220 000 g/mol Block Copolymer K1-3b:

Structure $S_1$-$(S/B)_4$-$S_2$-$(S/B)A$-$S_1$, (20-20-20-20-20% by weight), weight-average molar mass 200 000 g/mol The DSC graph for the block copolymer exhibited two broad (±20° C.) glass transition temperatures at +20° C. and 70° C.

Star-Shaped Block Copolymer K1-8

For production of a star-shaped styrene-butadiene block copolymer having the structure $S_1$-$(S/B)_4$-$S_2$-$X(S_3)_2$-$S_2$-$(S/B)_4$-$S_1$, 5385 ml of cyclohexane were used as initial charge, and titrated to the end point with 1.6 ml of a 1.4 M sec-butyllithium (s-BuLi) solution at 60° C., and then 4.91 ml of a 1.4 M sec-butyllithium solution were admixed for initiation, and 0.27 ml of a 0.847M potassium tert-amyl alcoholate (PTAA) solution was admixed as randomizer, and the temperature of the mixture was controlled to 61° C. The amount of styrene (560 g) needed for production of the blocks $S_1$ was then added, and the mixture was polymerized to full conversion. For production of the copolymer blocks $(S/B)_4$, a total of 168 g of butadiene and 392 g of styrene were simultaneously added in a plurality of portions, and the maximum temperature was limited to 73° C. by countercurrent cooling. 3.28 ml of s-BuLi and 280 g of styrene were then added to form the blocks $S_2$ and $S_3$, and the mixture was polymerized to full conversion.

The living polymer chains were then coupled using 1.79 ml of epoxidized soybean oil (Dehysol D82), and 0.83 ml of isopropanol was added, and 1.0% of $CO_2$/0.5% of water, based on solids, was used for acidification, and a stabilizer solution (0.2% of Sumilizer GS and 0.2% of Irganox 1010, based in each case on solids) was added. The cyclohexane was removed by vaporization in a vacuum oven.

Weight-average molar mass $M_w$ was 293 850 g/mol. The DSC graph for the block copolymer showed two broad (±20° C.) glass transition temperatures at +10° C. and +75° C.

Component K2

Standard polystyrene PS 158 K with $M_w$ 270 000 g/mol from BASF SE was used as component K2-1.

Standard polystyrene PS 165 H (BASF SE) was used as component K2-2; it had $M_w$ of 300 000 g/mol and white oil content of 3.5% by weight (medicinal white oil with viscosity 70 centistokes at 40° C.).

Standard polystyrene PS 143 E from BASF SE was used as component K2-3; it had $M_w$ of 270 000 g/mol; its white oil content is 5% by weight.

Block Copolymer K3

Block Copolymer K3-1:

A star-shaped block copolymer K3-1 (26% by weight of butadiene, 74% by weight of styrene) having random copolymer blocks S/B was produced via sequential anionic polymerization of styrene and butadiene and subsequent coupling using epoxidized linseed oil in accordance with example 17 of WO 00/58380.

Block Copolymer K3-2: Styroflex 2G66, Styrene-Butadiene Block Copolymer

Mixtures M 1 to M 19

The parts by weight stated in tables 2 to 6 of the block copolymers K1, and also of components K2 (Polystyrene PS 158 K or 165 H) and K3 were mixed at from 200 to 230° C. in a 16 mm twin-screw extruder and extruded by way of a slot die to give a foil of thickness 1 mm, or pressed to give sheets. The mixing ratios and mechanical and optical properties of the foils are collated in tables 2 to 6. Unless otherwise stated, the component stated in the top row was used.

TABLE 1

Structure and constitution of block copolymers in parts by weight

| Example | $S_1$ | $(S/B)_A$ | $S_2$ | $(S/B)_B$ | $S_3$ | S:B in $(S/B)_A$ | S:B in $(S/B)_B$ | Total styrene content [% by wt.] |
|---|---|---|---|---|---|---|---|---|
| K1-1 | 32.5 | 35 | 32.5 | | | 70:30 | | 89.5 |
| K1-2 | 30 | 40 | 30 | | | 75:25 | | 88 |
| K1-3 | 20 | 20 | 20 | 20 | 20 | 70:30 | | 88 |
| K1-4 | 20 | 30 | 20 | 10 | 20 | 70:30 | 50:50 | 86 |
| K1-5 | 25 | 20 | 25 | 5 | 25 | 70:30 | 30:70 | 91.5 |
| K1-6 | 26.66 | 10 | 26.66 | 10 | 26.66 | 70:30 | 70:30 | 94 |
| K1-7 | 26.66 | 10 | 26.66 | 10 | 26.66 | 70:30 | 50:50 | 92 |

TABLE 2

Properties of pressed sheets

| Mixture | K1-3a | K1-4 | K2-1 (PS 158K) | Modulus of elasticity [N/mm$^2$] | Yield stress [N/mm$^2$] | Tensile strain at break [%] |
|---|---|---|---|---|---|---|
| M1 | 90 | — | 10 | 1406 | 38.4 | 58.5 |
| M2 | 80 | — | 20 | 1547 | 40.1 | 49.8 |
| M3 | 70 | — | 30 | 1812 | 43.3 | 13.1 |
| M4 | 60 | — | 40 | 1906 | 45.6 | 7.5 |
| M5 | — | 90 | 10 | 1404 | — | 58.4 |
| M6 | — | 80 | 20 | 1618 | 40.7 | 30.1 |
| M7 | — | 70 | 30 | 1737 | 42.5 | 19.1 |
| M8 | — | 60 | 40 | 1903 | 45.4 | 3.5 |

TABLE 3

Properties of extruded foils of thickness 1 mm of mixtures M1 to M6

| | K1-3a | K2-2 (PS165H) | K3 | Modulus of elasticity [MPa] | | Tensile stress at break [MPa] | | Tensile strain at break [%] | | Opt. properties | |
|---|---|---|---|---|---|---|---|---|---|---|---|
| | | | | parallel | perp. | parallel | perp. | parallel | perp. | Transp. [%] | Haze [%] |
| M9 | 55 | 30 | 15 | 2139 | 1659 | 47.3 | 35.8 | 5.3 | 2.4 | 87.77 | 2.94 |
| M10 | 50 | 35 | 15 | 2168 | 1890 | 46.7 | 37.9 | 6.3 | 2.3 | 87.72 | 2.72 |
| M11 | 25 | 50 | 25 | 2253 | 1738 | 44.1 | 33.8 | 23.7 | 3.2 | 85.67 | 3.57 |
| M12 | 30 | 50 | 20 | 2278 | 1742 | 44.3 | 35.7 | 11.3 | 3.2 | 86.47 | 3.19 |
| M13 | 35 | 50 | 15 | 2342 | 2032 | 46.3 | 37.7 | 7.4 | 2.5 | 87.12 | 3.25 |

TABLE 4

Properties of extruded foils of thickness 1 mm of mixtures

| | K1-3b [% by wt.] | K2 [% by wt.] (PS165H) | K3 [% by wt.] Styrolux BX 6400 | Modulus of elasticity [MPa] | | Tensile stress at break [MPa] | | Tensile strain at break [%] | | Opt. properties | |
|---|---|---|---|---|---|---|---|---|---|---|---|
| | | | | parallel | perp. | parallel | perp. | parallel | perp. | Transp. [%] | Haze [%] |
| M14 | 50 | 30 | 20 | 2146 | 1978 | 41.4 | 38.9 | 8.8 | 8.7 | 85.4 | 7.37 |
| M15 | 45 | 30 | 25 | 2093 | 1865 | 40.2 | 36.4 | 29.8 | 27.4 | 84.17 | 7.87 |
| M16 | 40 | 30 | 30 | 2045 | 1792 | 39.3 | 34.4 | 29.8 | 27.8 | 84.82 | 8.38 |
| M17 | 25 | 50 | 25 | 2317 | 1951 | 41.4 | 35 | 35.1 | 37.7 | 83.05 | 9.03 |
| M18 | 25 | 45 | 30 | 2350 | 2010 | 40.3 | 35.5 | 37.4 | 36.5 | 83.7 | 8.48 |
| M19 | 30 | 45 | 25 | 2344 | 2044 | 42.9 | 37.2 | 5.6 | 5.0 | | 7.6 |
| M20 | 35 | 40 | 25 | 2321 | 2098 | 42.9 | 38.7 | 5.0 | 4.2 | | 8.1 |
| M21 | 40 | 35 | 25 | 2236 | 2031 | 42.8 | 38.6 | 4.7 | 4.2 | | 7.5 |
| M22 | 45 | 30 | 25 | 2150 | 1968 | 42.1 | 38.42 | 4.0 | 4.14 | | 6.7 |
| M23 | 40 | 35 PS 158K | 25 | 2330 | 2116 | 46.1 | 41.15 | 3.0 | 3.21 | | 4.1 |
| M24 | 40 | 35 PS 143E | 25 | 2259 | 2011 | 41.9 | 38.08 | 3.7 | 3.56 | | 6.8 |
| M25 | 35 | 15 PS 158K 22.5 PS 143E | 27.5 | 2267 | 1958 | 43.4 | 37.56 | 3.8 | 5.27 | | 5.4 |
| M26 | 30 | 40 | 30 | 2301 | 1920 | 43.3 | 35.95 | 9.8 | 8.48 | | 8.7 |
| M27 | 40 | 30 | 30 | 2122 | 1818 | 42 | 36.2 | 6.54 | 6.99 | | 7.6 |
| V1 | — | 60 | 40 | 2232 | 1565 | 34.25 | 24.31 | 47.74 | 43.34 | | 18.4 |
| V2 | — | 70 | 30 | 2488 | 1950 | 39.91 | 29.27 | 27.57 | 12.34 | | 14.3 |
| M28 | 100 | — | — | 2218 | 2203 | 44.55 | — | 2.7 | — | | 1.5 |

TABLE 4-continued

Properties of extruded foils of thickness 1 mm of mixtures

| | K1-3b [% by wt.] | K2 [% by wt.] (PS165H) | K3 [% by wt.] Styrolux BX 6400 | Modulus of elasticity [MPa] parallel | | Tensile stress at break [MPa] parallel | | Tensile strain at break [%] parallel | | Opt. properties Transp. [%] | Haze [%] |
|---|---|---|---|---|---|---|---|---|---|---|---|
| | | | | parallel | perp. | parallel | perp. | parallel | perp. | | |
| M29 | 40 | 25 PS 158K | 35 | 2166 | 1834 | 46.53 | 37.7 | 5.59 | 4.37 | | 4.4 |
| M30 | 70 | | 30 | 1767 | 1646 | 40.87 | 38.24 | 4.54 | 3.44 | | 2.9 |

TABLE 5

Properties of extruded foils of thickness 1 mm of mixtures

| | K1-3b [% by wt.] | K2-2 [% by wt.] (PS165H) | K3-1 [% by wt.] | Modulus of elasticity [MPa] | | Tensile stress at break [MPa] | | Tensile strain at break [%] | | Opt. properties Transp. [%] | Haze [%] |
|---|---|---|---|---|---|---|---|---|---|---|---|
| | | | | parallel | perp. | parallel | perp. | parallel | perp. | | |
| M31 | 30 | 50 | 20 | 2346 | 2102 | 42.2 | 37.3 | 17.8 | 9.8 | 83.1 | 6.0 |
| M32 | 40 | 40 | 20 | 2267 | 1818 | 41.6 | 37.2 | 12.2 | 7.5 | 83.6 | 6.2 |
| M33 | 50 | 30 | 20 | 2295 | 1945 | 47 | 36.5 | 31.0 | 2.5 | 85.3 | 4.6 |
| M34 | 25 | 50 | 25 | 2425 | 1891 | 46.5 | 33.1 | 53.0 | 3.1 | 85.8 | 8.5 |
| M35 | 35 | 40 | 25 | 2323 | 1902 | 46.6 | 35.6 | 56.7 | 3.0 | 85.1 | 7.9 |
| M36 | 45 | 30 | 25 | 2206 | 1732 | 46.3 | 35.1 | 46.8 | 3.6 | 85.9 | 7.1 |
| M37 | 76 | 19 | 5 K3-2 | 2089 | 1847 | 38.4 | 36.5 | 2.8 | 2.1 | 86.0 | 3.6 |
| M38 | 72 | 18 | 10 K3-2 | 2014 | 1657 | 38.1 | 35.2 | 4.3 | 11.1 | 83.6 | 7.6 |
| M39 | 33.25 | 38 | 5 K3-2 23.75 | 2026 | 1640 | 36.2 | 29.1 | 13.5 | 43.2 | 81.2 | 9.2 |
| M40 | 31.5 | 36 | 10 K3-2 22.5 | 1824 | 1338 | 29.9 | 24.5 | 73.6 | 174.0 | 80.6 | 11.4 |

TABLE 6

Properties of foils extruded with thickness of 1 mm from mixtures

| | K1 [% by wt.] K1-3 | $M_w$ [kg/mol] | K2-2 [% by wt.] (PS165H) | K3-1 [% by wt.] | Modulus of elasticity [MPa] | | Tensile stress at break [MPa] | | Tensile strain at break [%] | | Opt. properties Transp. [%] | Haze [%] |
|---|---|---|---|---|---|---|---|---|---|---|---|---|
| | | | | | parallel | perp. | parallel | perp. | parallel | perp. | | |
| M41 | 45 | 200 | 30 | 25 | 2154 | 1935 | 35.86 | 35.8 | 3.4 | 16.7 | 83.57 | 5.05 |
| M42 | 45 | 210 | 30 | 25 | 2094 | 1944 | 36.33 | 37.8 | 3.5 | 11.4 | 84.93 | 2.78 |
| M43 | 45 | 245 | 30 | 25 | 2056 | 1881 | 35.47 | 35.57 | 7.1 | 15.3 | 85.62 | 2.01 |
| M44 | 45 | 314 | 30 | 25 | 2012 | 1970 | 35.6 | 36.8 | 3 | 5.9 | 87.79 | 3.16 |
| M45 | 45 K1-8a | 170 | 30 | 25 | 2042 | 1955 | 37.7 | 37.62 | 2.4 | 4.9 | 85.48 | 3.51 |
| M46 | 45 K1-8b | 190 | 30 | 25 | 2088 | 1992 | 36.29 | 37.56 | 3.3 | 7.4 | 86.13 | 4.25 |
| M47 | 45 K1-8c | 289 | 30 | 25 | 2004 | 1738 | 37.25 | 36.18 | 4.4 | 26.4 | 87.34 | 1.65 |
| M48 | 42 K1-8c | 289 | 30 | 28 | 1948 | 1673 | 36.17 | 34.26 | 5.5 | 32.5 | 87.6 | 1.48 |
| M49 | 42 K1-8c | 289 | 30 | 28 | 1995 | 1626 | 34.91 | 31.59 | 6 | 39.3 | 85.38 | 3.46 |
| M50 | 45 K1-8c | 289 | 30 | 25 | 2012 | 1740 | 37.1 | 34.06 | 6.2 | 21.7 | 86.82 | 2.34 |

The invention claimed is:

1. A block copolymer or graft copolymer, comprising
a) at least one block S comprising from 95 to 100% by weight of vinylaromatic monomers and from 0 to 5% by weight of dienes, and
b) at least one copolymer block (S/B)$_A$ comprising from 63 to 80% by weight of vinylaromatic monomers and from 20 to 37% by weight of dienes, with a glass transition temperature Tg$_A$ in the range from 5 to 30° C., and
c) optionally at least one copolymer block (S/B)$_B$ comprising from 20 to 60% by weight of vinylaromatic monomers and from 40 to 80% by weight of dienes, with a glass transition temperature Tg$_B$ in the range from 0 to −110° C., wherein
the proportion by weight of the entirety of all of the blocks S is in the range from 50 to 70% by weight, based on the block copolymer or graft copolymer and the proportion by weight of the entirety of all of the blocks (S/B)$_A$ and (S/B)$_B$ is in the range from 30 to 50% by weight, based in each case on the block copolymer or graft copolymer; wherein if component c) is present the block copolymer has a linear structure having the block sequence S$_1$-(S/B)$_A$-S$_2$-(S/B)$_B$-S$_3$ and if component c) is not present the block copolymer has a linear structure having the block sequence S$_1$-(S/B)$_A$-S$_2$-(S/B)$_A$-S$_3$ where each of S$_1$, S$_2$, and S$_3$ is a block S; and wherein the proportion by weight of blocks S$_1$ and S$_2$, based on the block copolymer, is from 50% to 67% by weight and the total weight-average molar mass $M_w$ of the block copolymer or graft copolymer is in the range from 260,000 to 350,000 g/mol.

2. The block copolymer or graft copolymer according to claim 1, in which component c) is present.

3. The block copolymer or graft copolymer according to claim 2, wherein the ratio by weight of the copolymer blocks $(S/B)_A$ to the copolymer blocks $(S/B)_B$ is in the range from 80:20 to 50:50.

4. A mixture, comprising
K1) from 20 to 95% by weight of a block copolymer or graft copolymer according to claim 1, and
K2) from 5 to 80% by weight of General Purpose Polystyrene (GPPS) or impact-resistant polystyrene (HIPS), and
K3) from 0 to 50% by weight of a block copolymer which differs from K1 and is composed of vinylaromatic monomers and dienes.

5. The mixture according to claim 4, which comprises from 10 to 50% by weight of a block copolymer as component K3, where this block copolymer comprises
a) at least one block S comprising from 95 to 100% by weight of vinylaromatic monomers and from 0 to 5% by weight of dienes, and
b) at least one homopolydiene (B) or copolymer block $(S/B)_B$ comprising from 0 to 60% by weight of vinylaromatic monomers and from 40 to 100% by weight of dienes, with glass transition temperature $Tg_B$ in the range from 0 to −110° C.,
wherein the proportion by weight of the entirety of all of the blocks S is in the range from 25 to 90% by weight, and the proportion by weight of the entirety of all of the blocks $(S/B)_B$ is in the range from 10 to 75% by weight, based in each case on the block copolymer.

6. The mixture according to claim 4, which comprises from 10 to 30% by weight of a block copolymer as component K3, where this block copolymer comprises
a) at least one block S comprising from 95 to 100% by weight of vinylaromatic monomers and from 0 to 5% by weight of dienes, and
b) at least one copolymer block $(S/B)_B$ comprising from 20 to 60% by weight of vinylaromatic monomers and from 40 to 80% by weight of dienes, with a glass transition temperature $Tg_B$ in the range from 0 to −80° C.,
where the proportion by weight of the entirety of all of the blocks S is in the range from 25 to 70% by weight, and the proportion by weight of the entirety of all of the blocks $(S/B)_B$ is in the range from 30 to 75% by weight, based in each case on the block copolymer.

7. A foil or molding for the packaging of electronic components comprising the mixture according to claim 4.

8. A blister pack, pot, or extruded hollow profile for the packaging of electronic components comprising the mixture according to claim 4.

9. The block copolymer or graft copolymer according to claim 1, wherein component c) is not present.

10. The block copolymer or graft copolymer according to claim 1, wherein the at least one copolymer block $(S/B)_A$ comprises from 70 to 75% by weight styrene units and from 25 to 30% by weight of butadiene units.

* * * * *